United States Patent
Hojabri

(10) Patent No.: US 6,870,569 B1
(45) Date of Patent: Mar. 22, 2005

(54) INTEGRATED MULTILEVEL SIGNAL DEMULTIPLEXOR

(75) Inventor: Peyman Hojabri, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 682 days.

(21) Appl. No.: 09/906,433

(22) Filed: Jul. 16, 2001

(51) Int. Cl.$^7$ .......................... H04N 11/04; H03H 11/26
(52) U.S. Cl. ....................... 348/530; 348/529; 370/536
(58) Field of Search .................... 348/529–532, 348/540–547, 423.1, 464, 465, 516–517, 525; 370/535–537, 503, 540–545; 327/62, 74, 76, 415; 341/141, 144

(56) References Cited

U.S. PATENT DOCUMENTS

| | | | | |
|---|---|---|---|---|
| 4,680,622 A | * | 7/1987 | Barnes et al. | 348/598 |
| 5,161,117 A | * | 11/1992 | Waggener, Jr. | 708/204 |
| 5,351,129 A | * | 9/1994 | Lai | 348/584 |
| 5,537,148 A | * | 7/1996 | Fujinami | 348/473 |
| 5,734,283 A | * | 3/1998 | Hedberg | 327/277 |
| 5,974,055 A | * | 10/1999 | Imanishi | 370/503 |
| 6,064,443 A | * | 5/2000 | Lee | 348/530 |
| 6,111,897 A | * | 8/2000 | Moon | 370/535 |
| 6,246,439 B1 | * | 6/2001 | Zink et al. | 348/473 |
| 6,650,371 B1 | * | 11/2003 | Morrish et al. | 348/569 |
| 6,788,711 B1 | * | 9/2004 | Sumioka | 370/542 |

OTHER PUBLICATIONS

"150 MHz Video Controller with 12c–bus Data Sheet." Philips Semiconductors, pp 1–55, Nov. 25, 1997.

* cited by examiner

Primary Examiner—Paulos M. Natnael
(74) Attorney, Agent, or Firm—Vedder Price Kaufman & Kammholz, P.C.

(57) ABSTRACT

An integrated circuit with a signal demultiplexor for separating out two signals of different magnitudes from within a multiplexed signal without requiring a large capacitance for signal filtering. A multiple-threshold input comparator stage separates the multiplexed input signal into a first fully demultiplexed signal and a first partially demultiplexed signal. The first fully and partially demultiplexed signals are logically processed in an Exclusive-OR gate to produce a second partially demultiplexed signal which is then time-delayed and gated by the first fully demultiplexed signal. The resultant gated signal is low pass filtered to produce a second fully demultiplexed signal. In a video signal application, the multiplexed input signal would be a "sandcastle" signal containing both horizontal clamp and vertical synchronization signals, with the horizontal clamp signal component being greater in magnitude than the vertical synchronization signal component, and the resulting first and second fully demultiplexed signals would be the separated horizontal clamp and vertical synchronization signals, respectively.

12 Claims, 2 Drawing Sheets

INTEGRATED MULTILEVEL SIGNAL DEMULTIPLEXOR

BACKGROUND OF THE INVENTION

1. Field of the Invention

The present invention relates to signal demultiplexor circuits, in particular, to integrated signal demultiplexor circuits for separating signal components having both different magnitudes and frequencies.

2. Description of the Related Art

As integrated circuits have become more complex and sophisticated by including more functions and capabilities, an increasingly common and significant problem is that of sufficient available terminals, or pins, through which to convey the necessary interface signals, whether input or output. Of particular interest, for purposes of the present invention, are those circuits used for providing the signal processing and control functions for video circuits, such as for video monitories and displays.

In particular, two common interface signals which in recent years have become combined, or multiplexed, into one signal are the horizontal clamp and vertical synchronization signals used for controlling the horizontal clamp circuitry and synchronizing the vertical scanning circuitry, respectively, within a video monitor or display, such as those used for computers. As is well known in the art, the horizontal clamp signal has a typical period of 30 kilohertz (khz) with a typical asserted pulse width of three microseconds (usec). As is also well known, the vertical synchronization signal has a typical period of 70 khz, with a typical asserted pulse width of 500 usec. When multiplexed, the combined signal, sometimes referred to as a "sand castle" signal because of the shape of the waveform, includes a horizontal clamp signal component summed with a vertical synchronization signal component. The vertical synchronization signal component is approximately one half the amplitude of the horizontal clamp signal component, thereby displaying a tri-level signal characteristic. By doing this, only one interface signal path is required instead of two, while the constituent signal components are easily demultiplexed, or separated.

However, it is this signal demultiplexing, or separating, where problems arise, generally in the form of undesirable time delays between the demultiplexed signal components. Because of the multiplexed nature of the signal, typical demultiplexing techniques involve the use of filtering. With the relatively significant frequency difference between the two signal components, filtering is a simple and otherwise desirable technique for separating the signal components. However, filtering necessarily involves the use of capacitance, and as a result, undesirable time delays are often introduced.

Accordingly, it would be desirable to have a technique for demultiplexing combined signals of different frequencies with minimal, if any, use of filtering, particularly in an integrated circuit environment where the implementation of capacitors is difficult and expensive in terms of die surface area.

SUMMARY OF THE INVENTION

An integrated signal demultiplexing circuit in accordance with the present invention separates combined signals of different magnitudes from within a multiplexed signal without requiring a large capacitance for signal filtering, thereby being of particular benefit within an integrated circuit environment. An input stage, using multiple threshold reference signals, separates the multiplexed input signal into one fully demultiplexed signal and one partially demultiplexed signal. The fully and partially demultiplexed signals are logically processed to produce a second further partially demultiplexed signal, which is then time delayed and gated by the first fully demultiplexed signal. The resulting gated signal can then be low passed filtered to produce a second fully demultiplexed signal.

An integrated circuit with a signal demultiplexor in accordance with one embodiment of the present invention includes signal separating circuitry, signal processing circuitry and signal gating circuitry. The signal separating circuitry receives a multiplexed signal with first, second and third input signal state levels transcending a lower signal threshold, transcending an upper signal threshold and having a value between the lower and upper signal thresholds, respectively, separates first and second input signals from the multiplexed signal, and provides corresponding first and second separated signals. The first separated signal includes first and second separated signal state levels corresponding to the first and second input signal state levels, while the second separated signal includes a third separated signal state level corresponding to the first input signal state level and a fourth separated signal state level corresponding to the second and third input signal state levels. The signal processing circuitry, coupled to the signal separated circuitry, receives and processes the first and second separated signals to provide a processed signal with first and second processed signal state levels corresponding to and time delayed from the first, second and third input signal state levels. The first processed signal state level corresponds to the first and second input signal state levels, while the second processed signal state level corresponds to the third input signal state level. The signal gating circuitry, coupled to the signal separating and processing circuitry, receives the processed and first separated signals and gates the processed signal in response to the first and second separated signal state levels to provide a gated signal with a plurality of asserted signal states defining a time interval substantially equal in duration to another time interval during which the third multiplexed signal state level is between the lower and upper signal thresholds.

An integrated circuit with a video signal demultiplexor in accordance with another embodiment of the present invention includes first and second comparator circuitry, logic circuitry and gating circuitry. The first comparator circuitry receives and compares a multiplexed signal and a first threshold signal to generate a first demultiplexed signal. The multiplexed signal includes simultaneous horizontal clamp and vertical synchronization signal components and the first demultiplexed signal excludes the vertical synchronization signal component. The second comparator circuitry receives and compares the multiplexed signal and a second threshold signal to generate a second demultiplexed signal. The second demultiplexed signal includes nonsimultaneous horizontal clamp and vertical synchronization signal components. The logic circuitry, coupled to the first and second comparator circuitry, receives and logically compares the first and second demultiplexed signals to generate a logic signal which includes an inverted and time delayed horizontal clamp signal component during time intervals defined by and time delayed from the vertical synchronization signal component of the multiplexed signal. The gating circuitry, coupled to the first comparator circuitry and the logic circuitry, receives and gates the logic signal in response to the first demultiplexed signal to generate a gated signal with a cumulative asserted gated signal state substantially equal in duration to a time interval defined by the vertical synchronization signal component of the multiplexed signal.

DETAILED DESCRIPTION OF THE INVENTION

Figure 1:
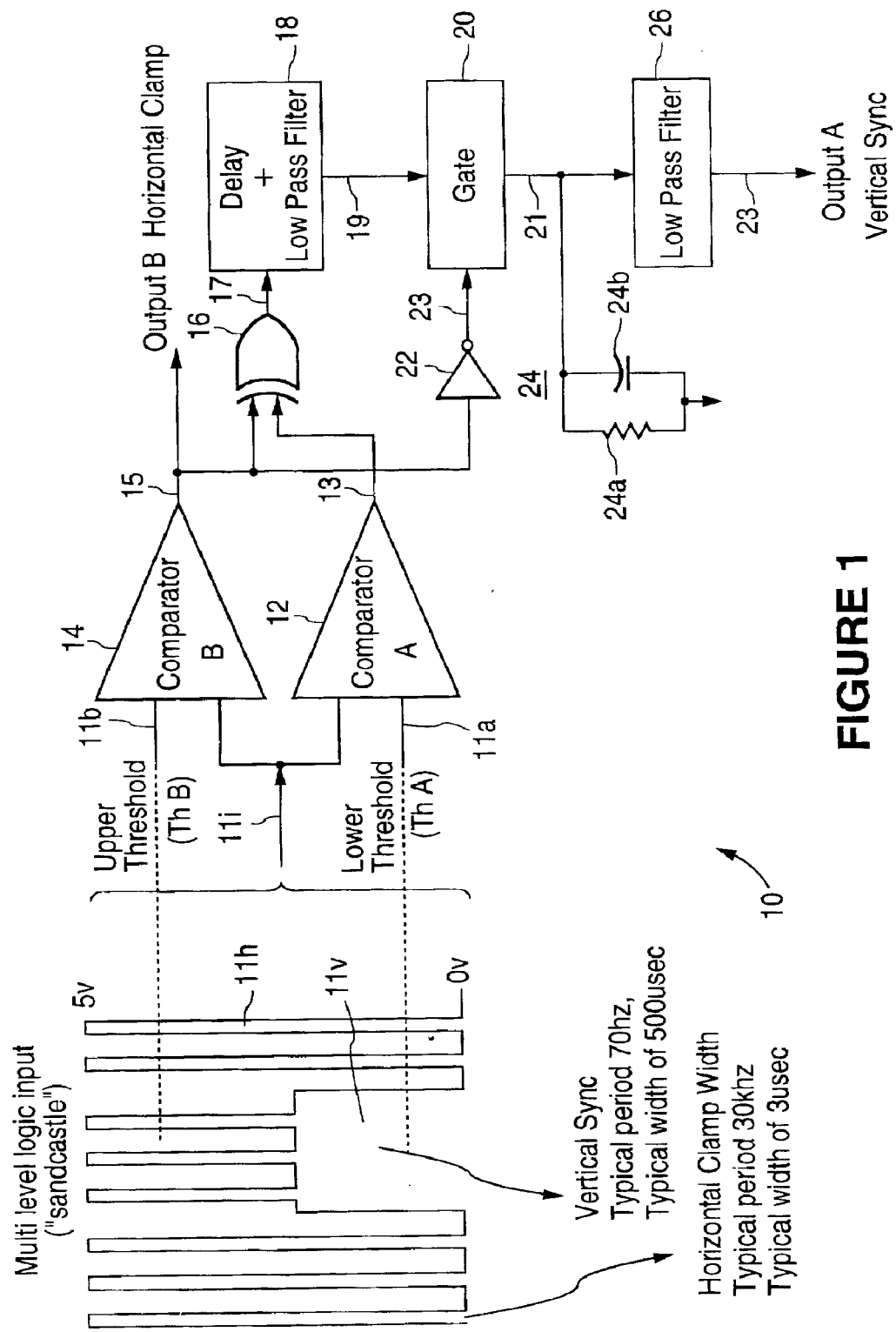
FIG. 1 is a functional block diagram of an integrated signal demultiplexing circuit in accordance with one embodiment of the present invention.

Referring to FIG. 1, an integrated signal demultiplexing circuit 10 in accordance with one embodiment of the present invention includes two signal comparators 12, 14, a logic circuit 16, a low pass filter stage 18 with a time delay, a gating circuit 20, a signal inverter circuit 22, and a set up and hold circuit 24, all interconnected substantially as shown. The set up and hold circuit 24 includes a resistor 24a and small capacitor 24b connected in shunt at the output 21 of the gating circuit 20. Also, a low pass filter stage 26 can be used to further filter the output signal 21 from the gating circuit 20.

General operation of the circuit is as follows. The multilevel, multiplexed input signal 11i (e.g., containing both horizontal 11h and vertical 11v signal components such as those used in video signal applications) is received and compared by the signal comparator circuits 12, 14 with a lower threshold signal 11a and an upper threshold signal 11b. The output of the second comparator circuit 14 provides the fully demultiplexed horizontal clamp signal 15. This signal 15 is inverted by a signal inverter 22, and is also logically processed with the signal 13 from the first comparator circuit 12 in the logic circuit 16 (e.g., an Exclusive-OR circuit). The resulting logically processed signal 17 is time-delayed and low passed filtered by the filter stage 18. This filtered signal 19 is then gated in the gating circuit 20 in response to the inverted signal version 23 of the demultiplexed horizontal clamp signal 15. In accordance with well known circuit design techniques, the gating circuit 20 can be implemented by interconnecting a plurality of pass transistors to form a transmission gate. Also, the functionality of the signal inverter 22 can be realized, without actually using a distinct inverter circuit per se, by driving the input terminals (e.g., gate terminals of NMOS and PMOS transistors) of the transmission gate 20 with the appropriate signal levels (i.e., asserted and de-asserted) of the fully demultiplexed horizontal clamp signal 15.

The gated signal 21 is set up and held by the set up and hold circuit 24, where positive assertions of the gated signal 21 quickly charge the capacitor 24b while during de-assertions of the gated signal 21 the resistor 24a causes the capacitor 24b to discharge slowly (as will be discussed in further detail below). The resulting set up and held signal can then be further low pass filtered by the low pass filter stage 26 to produce a fully demultiplexed vertical synchronization signal 23, with minimal time delay as between the vertical signal component 11v at the input and the demultiplexed signal 23 at the output.

Figure 2:
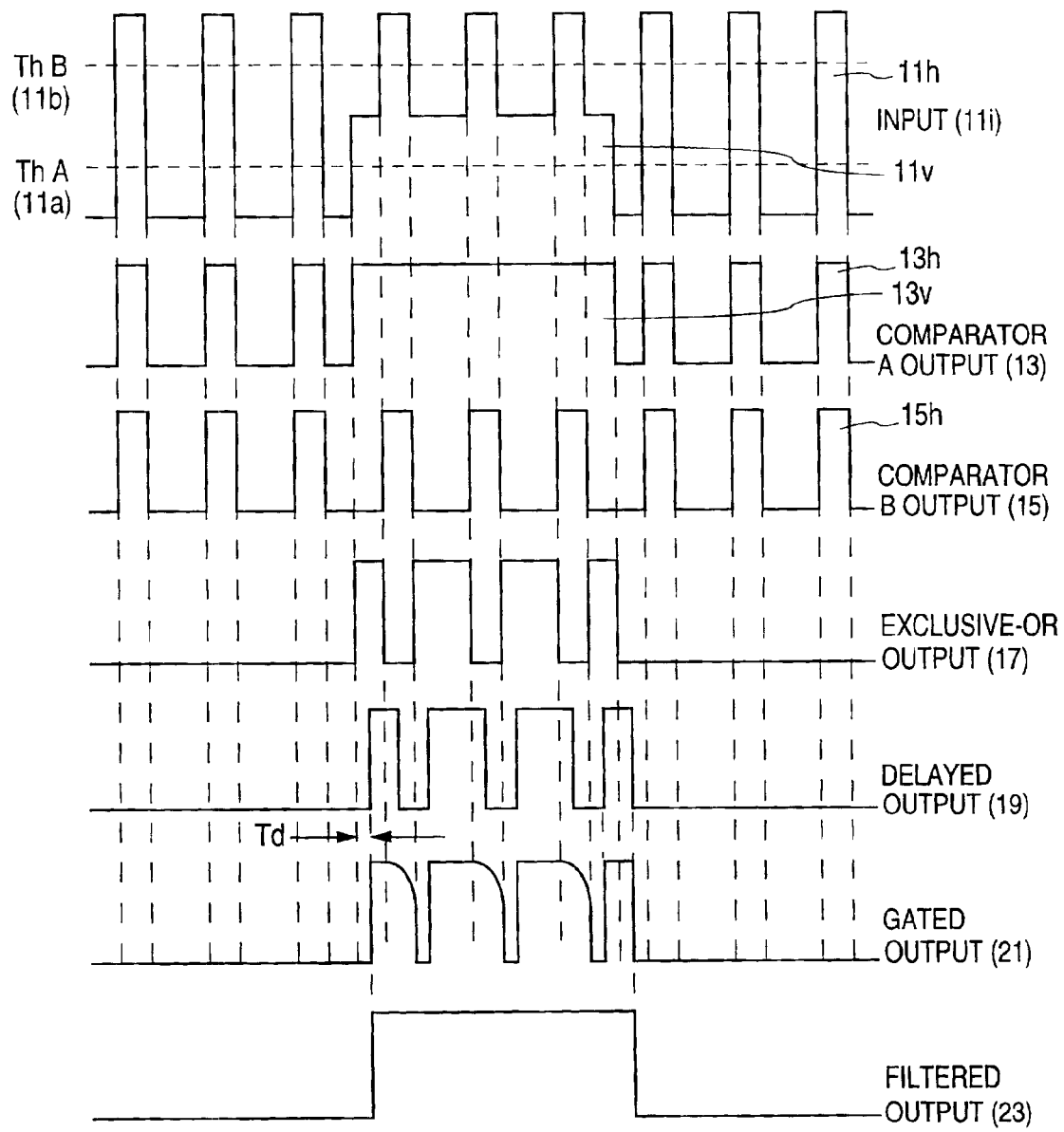
FIG. 2 is a signal timing diagram illustrating signal waveforms for the various signals generated within the circuit of FIG. 1.

Referring to FIG. 2, the foregoing circuit operation can be explained in terms of signal waveforms and timing. As shown, the multiplexed input signal 11i contains both horizontal 11h and vertical 11v signal components, which, together, form a tri-level signal, with the vertical signal component 11v being of less magnitude then the horizontal signal component 11h. In accordance with well known signal comparator circuit operation, the first comparator 12 compares the input signal 11i to the lower threshold signal 11a, and generates an signal 13 containing mutually exclusive signal assertions coincident with the signal assertions of the horizontal 11h and vertical 11v signal components of the input signal 11i. In other words, this signal 13 contains signal assertions 13h coincident with the horizontal signal assertions 11h of the input signal 11i, and signal assertions 13v coincident with the vertical signal component 11v of the input signal 11i. Hence, this signal 13 represents a partially demultiplexed signal since it contains both vertical 13v and horizontal 13h signal components; however, such signal components 13v, 13h occur during mutually exclusive time intervals.

The second comparator output signal 15 is a fully demultiplexed signal since it contains only signal assertions 15h coincident with the horizontal signal components 11h of the input signal 11i.

These fully 15 and partially 13 demultiplexed signals are logically processed by the logic circuit 16. This logic output signal 17 contains signal assertions which, in accordance with well known exclusive-or logic gate operation, occur only during those time intervals during which only one, but not both, of the input signals 13, 15 is asserted. Hence, due to the timing alignment of the input signal 13, 15 waveforms, the logic circuit output signal 17 only contains signal assertions during the time window defined by the vertical signal component 11v.

This signal 17 is then time-delayed and low pass filtered to produce an output signal 19, which is time-delayed by a short time interval Td (which is ideally on the order of tens of nanoseconds). This time-delayed signal 19 is then gated by the gating circuit 20 in response to the inverted demultiplexed horizontal clamp signal 23. Hence, as illustrated in FIG. 2, this gated signal 21 contains signal assertions during a time interval substantially equal in duration to that of the vertical signal component 11v of the input signal 11i, and which occur coincident with the asserted states of the delayed signal 19 and de-asserted states (due to the signal inversion by the inverter 22) of the fully demultiplexed horizontal clamp signal 15.

The set up and hold circuit 24 maintains the amplitude of this gated signal 21 during a portion of the time that the gated signal 21 is de-asserted in response to the gating control signal 23.

This gated signal 21 can be further low pass filtered (e.g., by a relatively wideband low pass filter so as to introduce virtually no further time delay) to produce a final filtered output signal 23 as the fully demultiplexed vertical synchronization signal corresponding to the vertical signal component 11v of the input signal 11i, with only the minimal time delay Td introduced by the delay and low pass filter stage 18 for purposes of allowing gating by the horizontal clamp signal 15.

Based upon the foregoing, it should be appreciated that the circuit of FIG. 1, by logically processing together fully and partially demultiplexed signals and introducing a time delay to allow for time demultiplexing in the form of signal gating, provides fully demultiplexed horizontal clamp and vertical synchronization signals without requiring the use of any significant filter circuits. This allows minimal capacitances to be used, thereby making such a circuit ideal for use in a fully integrated circuit environment.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including an integrated circuit with a signal demultiplexor, comprising:

signal separating circuitry that receives a multiplexed signal with first, second and third input signal state levels transcending a lower signal threshold, transcending an upper signal threshold and having a value between said lower and upper signal thresholds, respectively, separates first and second input signals from said multiplexed signal, and provides corresponding first and second separated signals, wherein said first separated signal includes first and second separated signal state levels corresponding to said first and second input signal state levels, and said second separated signal includes a third separated signal state level corresponding to said first input signal state level and a fourth separated signal state level corresponding to said second and third input signal state levels;

signal processing circuitry, coupled to said signal separated circuitry, that receives and processes said first and second separated signals to provide a processed signal with first and second processed signal state levels corresponding to and time delayed from said first, second and third input signal state levels, wherein said first processed signal state level corresponds to said first and second input signal state levels, and said second processed signal state level corresponds to said third input signal state level; and signal gating circuitry, coupled to said signal separating and processing circuitry, that receives said processed and first separated signals and gates said processed signal in response to said first and second separated signal state levels to provide a gated signal with a plurality of asserted signal states defining a time interval substantially equal in duration to another time interval during which said third multiplexed signal state level is between said lower and upper signal thresholds.

2. The apparatus of claim 1, wherein said signal separating circuitry comprises:

a first signal comparator circuit that receives and compares said multiplexed signal and a first threshold signal to generate said first separated signal; and a second signal comparator circuit that receives and compares said multiplexed signal and a second threshold signal to generate said second separated signal.

3. The apparatus of claim 1, wherein said signal processing circuitry comprises:

logic circuitry that processes said first and second separated signals to provide a logic signal with first and second logic signal state levels corresponding to said first and second processed signal state levels; and time delay circuitry, coupled to said logic circuitry, that receives and time delays said logic signal to provide said processed signal.

4. The apparatus of claim 3, wherein said logic circuitry comprises an Exclusive-OR logic gate.

5. The apparatus of claim 1, wherein said signal gating circuitry comprises one or more pass transistors.

6. The apparatus of claim 1, further comprising low pass filter circuitry, coupled to said signal gating circuitry, that filters said gated signal.

7. An apparatus including an integrated circuit with a video signal demultiplexor, comprising:

first comparator circuitry that receives and compares a multiplexed signal and a first threshold signal to generate a first demultiplexed signal, wherein said multiplexed signal includes simultaneous horizontal clamp and vertical synchronization signal components and said first demultiplexed signal excludes said vertical synchronization signal component;

second comparator circuitry that receives and compares said multiplexed signal and a second threshold signal to generate a second demultiplexed signal, wherein said second demultiplexed signal includes nonsimultaneous horizontal clamp and vertical synchronization signal components;

logic circuitry, coupled to said first and second comparator circuitry, that receives and logically compares said first and second demultiplexed signals to generate a logic signal which includes an inverted and time delayed horizontal clamp signal component during time intervals defined by and time delayed from said vertical synchronization signal component of said multiplexed signal; and gating circuitry, coupled to said first comparator circuitry and said logic circuitry, that receives and gates said logic signal in response to said first demultiplexed signal to generate a gated signal with a cumulative asserted gated signal state substantially equal in duration to a time interval defined by said vertical synchronization signal component of said multiplexed signal.

8. The apparatus of claim 7, wherein said logic circuitry comprises an Exclusive-OR logic gate.

9. The apparatus of claim 7, wherein said gating circuitry comprises one or more pass transistors.

10. The apparatus of claim 7, further comprising low pass filter circuitry, coupled to said gating circuitry, that filters said gated signal.

11. An apparatus including an integrated circuit with a signal demultiplexor, comprising:

signal separating means for receiving a multiplexed signal with first, second and third input signal state levels that transcend a low signal threshold, transcend an upper signal threshold and have a value between said lower and upper signal thresholds, respectively, separating first and second input signals from said multiplexed signal, and providing corresponding first and second separated signals, wherein said first separated signal includes first and second separated signal state levels corresponding to said first and second input signal state levels, and said second separated signal includes a third separated signal state level corresponding to said first input signal state level and a fourth separated signal state level corresponding to said second and third input signal state levels;

signal processing means for receiving and processing said first and second separated signals and providing a processed signal with first and second processed signal state levels that correspond to and are time delayed from said first, second and third input signal state levels, wherein said first processed signal state level corresponds to said first and second input signal state levels, and said second processed signal state level corresponds to said third input signal state level; and signal gating means for receiving said processed and first separated signals, gating said processed signal in response to said first and second separated signal state levels and providing a gated signal with a plurality of asserted signal states that define a time interval substantially equal in duration to another time interval during which said third multiplexed signal state level is between said lower and upper signal thresholds.

12. An apparatus including an integrated circuit with a video signal demultiplexor, comprising:

first comparator means for receiving and comparing a multiplexed signal and a first threshold signal and generating a first demultiplexed signal, wherein said multiplexed signal includes simultaneous horizontal clamp and vertical synchronization signal components and said first demultiplexed signal excludes said vertical synchronization signal component;

second comparator means for receiving and comparing said multiplexed signal and a second threshold signal and generating a second demultiplexed signal, wherein said second demultiplexed signal includes nonsimultaneous horizontal clamp and vertical synchronization signal components;

logic means for receiving and logically comparing said first and second demultiplexed signals and generating a logic signal which includes an inverted and time delayed horizontal clamp signal component during time intervals defined by and time delayed from said vertical synchronization signal component of said multiplexed signal; and gating means for receiving and gating said logic signal in response to said first demultiplexed signal and generating a gated signal with a cumulative asserted gated signal state substantially equal in duration to a time interval defined by said vertical synchronization signal component of said multiplexed signal.

* * * * *

UNITED STATES PATENT AND TRADEMARK OFFICE
CERTIFICATE OF CORRECTION

PATENT NO.    : 6,870,569 B1
DATED         : March 22, 2005
INVENTOR(S)   : Peyman Hojabri It is certified that error appears in the above-identified patent and that said Letters Patent is hereby corrected as shown below:

Column 6,
Line 47, please delete "low", insert -- lower --.

Signed and Sealed this

Twenty-fourth Day of May, 2005

JON W. DUDAS
*Director of the United States Patent and Trademark Office*